United States Patent
Beyda

(10) Patent No.: US 7,634,075 B2
(45) Date of Patent: Dec. 15, 2009

(54) APPARATUS AND SYSTEMS FOR UTILIZING CALLER ID DATA TO AUTOMATE RETURN CALL PROCESSING

(75) Inventor: William J. Beyda, Cupertino, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 431 days.

(21) Appl. No.: 10/759,790

(22) Filed: Jan. 16, 2004

(65) Prior Publication Data

US 2004/0146146 A1    Jul. 29, 2004

Related U.S. Application Data

(63) Continuation of application No. 09/738,533, filed on Dec. 15, 2000, now Pat. No. 6,721,399.

(51) Int. Cl.
*H04M 3/42* (2006.01)
(52) U.S. Cl. .............. 379/210.01; 379/88.19; 379/142.04
(58) Field of Classification Search .......... 379/88.19, 379/142.01, 210.01, 67.1, 88.12, 88.15, 142.17, 379/142.04
See application file for complete search history.

(56) References Cited

U.S. PATENT DOCUMENTS

| | | | |
|---|---|---|---|
| 4,241,238 A | 12/1980 | Strand | |
| 4,443,664 A | 4/1984 | Gange | |
| 4,924,491 A | 5/1990 | Compton | |
| 5,283,818 A | 2/1994 | Klausner et al. | |
| 5,390,236 A | 2/1995 | Klausner et al. | |
| 5,394,445 A | 2/1995 | Ball et al. | |
| 5,467,385 A | 11/1995 | Reuben et al. | |
| 5,502,761 A | 3/1996 | Duncan | |
| 5,572,576 A * | 11/1996 | Klausner et al. | 379/88.11 |
| 5,764,731 A * | 6/1998 | Yablon | 379/88.15 |
| 5,841,838 A | 11/1998 | Itoh et al. | |
| 5,883,942 A | 3/1999 | Lim | |
| 5,915,000 A | 6/1999 | Nguyen | |
| 5,937,050 A * | 8/1999 | Yue et al. | 379/100.06 |
| 5,943,397 A | 8/1999 | Gabin | |
| 5,943,410 A * | 8/1999 | Shaffer et al. | 379/213.01 |
| 6,067,349 A | 5/2000 | Suder | |
| 6,094,475 A * | 7/2000 | Kang | 379/84 |
| 6,215,858 B1 * | 4/2001 | Bartholomew et al. | 379/88.17 |
| 6,292,543 B1 | 9/2001 | Cannon et al. | |
| 6,314,284 B1 | 11/2001 | Patel . | |
| 6,343,120 B1 | 1/2002 | Rhodes | |
| 6,377,927 B1 | 4/2002 | Loghmani et al. | |

(Continued)

FOREIGN PATENT DOCUMENTS

EP    0588101    *    3/1994

OTHER PUBLICATIONS

Beyda, U.S. Appl. No. 09/738,812, filed Dec. 15, 2000, Method and Apparatus for Forwarding Caller ID Data From a Call Answering Device.

(Continued)

*Primary Examiner*—Olisa Anwah

(57) ABSTRACT

Apparatus and systems for recording Call ID data and transmitting the Caller ID data to remote telecommunications devices on demand, to fully or partially automate the dialing process for remotely calling back a message sender.

11 Claims, 4 Drawing Sheets

U.S. PATENT DOCUMENTS

| | | |
|---|---|---|
| 6,393,106 B1 | 5/2002 | Cannon |
| 6,393,108 B1 * | 5/2002 | McElwee .................. 379/88.19 |
| 6,396,906 B1 * | 5/2002 | Kaplan ....................... 379/67.1 |
| 6,427,009 B1 | 7/2002 | Reese |
| 6,466,782 B2 | 10/2002 | Ishikawa |
| 6,493,431 B1 | 12/2002 | Troen-Krasnow et al. |
| 6,498,931 B1 | 12/2002 | Mayak |
| 6,532,286 B1 | 3/2003 | Burg |
| 6,567,506 B1 | 5/2003 | Kermani |
| 6,597,785 B1 | 7/2003 | Burke |
| 7,003,305 B2 * | 2/2006 | Urs ............................. 455/466 |
| 7,023,978 B2 * | 4/2006 | Gilbert .................. 379/221.09 |
| 2003/0216148 A1 | 11/2003 | Henderson |
| 2004/0037402 A1 * | 2/2004 | Adamczyk et al. ....... 379/88.22 |

OTHER PUBLICATIONS

Beyda, U.S. Appl. No. 09/738,532, filed Dec. 15, 2000, Methods and Apparatus for Forwarding Caller ID Data From a Call Answering Device Utilizing a Call Control System.

* cited by examiner

APPARATUS AND SYSTEMS FOR UTILIZING CALLER ID DATA TO AUTOMATE RETURN CALL PROCESSING

This is a continuation of application Ser. No. 09/738,533, filed Dec. 15, 2000 now U.S. Pat. No. 6,721,399.

BACKGROUND OF THE INVENTION

1. Field of the Invention

The invention relates to the forwarding of "Caller ID data", defined herein to include any non-verbal information containing a calling party's telephone number, recorded by a call answering device. More particularly, the invention relates to apparatus and systems for recording Call ID data and transmitting the Caller ID data to remote telecommunications devices on demand, to fully or partially automate the dialing process for remotely calling back a message sender.

2. Brief Description of the Prior Art

Caller ID service has become quite common in telephone systems throughout the country. Caller ID service can transmit a data signal together with the ringing signal when a call is placed. The called telephone receives the Caller ID data signal together with the ringing signal.

If the called telephone has the appropriate display, the name and telephone number (sometimes referred to herein as the "callback" number) of the calling party is displayed on the called telephone display.

An obvious purpose for Caller ID data is to facilitate call screening. If the called party does not wish to speak with the calling party, the called party can choose not to answer the phone.

Automatic call answering devices have been available for many decades. Examples include modern multimedia messaging systems, voicemail systems and simple answering machines. Single line devices like simple answering machines couple to the customer's telephone line at the customer's premises. Multi-line devices like voicemail systems may be coupled to subscriber lines at a telephone company central office or at a PBX.

Although the aforementioned types of answering devices are very different, they operate in similar ways. Typically an automatic answering device answers the customer's telephone after a programmed number of rings, plays a prerecorded announcement and records a message spoken by the calling party. Most modern answering devices also record the date and time of each message recorded.

A non-obvious benefit of Caller ID service is that the Caller ID service can be used together with an answering device to determine the phone number of a caller who left a message without speaking his phone number or who spoke his phone number in a manner which could not be understood.

Many Caller ID devices have a memory for storing the names and numbers of at least the last twenty-five callers. Many modern Caller ID devices also have a "callback" option which causes a selected one of the stored numbers to be dialed. The callback option can be used very effectively to return calls to callers who left messages on the answering device without having to write down a number and dial it manually. Unfortunately, this advantageous use of Caller ID data is only available if messages are retrieved at the called number using the answering device physically located at the called number.

Both answering machines and voicemail systems commonly allow customers to retrieve voice messages from virtually any telephone anywhere. When voice messages are retrieved using a telephone having a number different from the number dialed by the callers who left the voice messages, no Caller ID data is available. This situation also exists with cordless phones which, although having the number called by the callers who left messages, were turned off or out of range at the time the message was left.

It is very common for people to call answering devices using cell phones and/or pay phones where, for the reasons described above, no Caller ID information is available. This usually requires the person retrieving the messages to write down telephone numbers of callers who spoke their number and then manually redial the numbers to return the calls.

It would be much more convenient, particularly when using a cell phone to retrieve messages while driving for example, to be able to call back a person who left a message with little manual intervention, for example by simply pushing one button as one would with the call back feature of a Caller ID device, or in some instances with no manual interaction at all.

Some answering devices do collect Caller ID information and allow a person retrieving messages to call back the person who left the message. However, this feature can be very expensive and can result in so-called "trombone connections". For example, if a NY cell phone customer is traveling in CA and retrieves a voice mail message from the person he is trying to meet in CA, an answering device call back feature would result in two coast-to-coast long distance calls, i.e. a trombone connection.

SUMMARY OF THE INVENTION

It is therefore an object of the invention to provide methods and apparatus whereby a call can be fully or partially be automatically placed from a remote location to a person who left a message on an answering device without causing a trombone connection.

It is also an object of the invention to provide methods and apparatus for transmitting Caller ID data from a called answering device directly to the endpoint of the remote user (i.e., their wireless phone handset, ToL PC client, IP phone, or any digital phone such as an Optiset phone, etc.).

It is another object of the invention to provide methods and apparatus for forwarding Caller ID data on demand from an answering device to a calling device other than the calling (message retrieval) device, such as a call control system (e.g., a central office to which the calling device is connected), a Caller ID device associated with but not necessarily part of the calling (endpoint message retrieval) device, etc.

It is yet another object of the invention to provide methods and apparatus which automate the dialing process with little or no intervention when calling back a message sender.

Still further, it is an object of the invention to be able to retrieve at a remote location, the telephone number of a party leaving a message on an answering device, without having to write the number down or directing attention (as when driving, for example), to remembering the telephone number associated with the message sender.

In accord with these objects which will be discussed in detail below, the methods according to the invention include (a) collecting Caller ID data at an answering device and (b) transmitting (or interchangeably forwarding) Caller ID data to a calling device which is accessing the answering device for the purpose of retrieving stored messages or simply for the purpose of retrieving Caller ID data.

According to one embodiment of the invention, utilizing a telephone device having a redial buffer (or other form of associated Caller ID data storage), Caller ID data is sent to the redial buffer memory (or associated memory) of the telephone device. The redial button on the telephone can then, for example, be used to quickly call back the person who left the message just retrieved. Only one connection is used to call back and the trombone type connection is avoided.

According to another embodiment of the invention, utilizing a telephone device with a built-in or associated Caller ID device, Caller ID data is transmitted to the Caller ID device when the telephone is used to retrieve messages from an answering device or used to simply retrieve Caller ID data from the answering device. The Caller ID device in the telephone can then be used to quickly call back the persons who previously called the answering device regardless of whether they left messages on the answering device. Only one connection is used to call back and the trombone type connection is avoided.

According to another embodiment of the invention, utilizing a telephone lacking a Caller ID device or a redial buffer memory, Caller ID data is transmitted from the answering device to a call control system (such as the central office of the calling phone, a PBX, ToL Gatekeeper, wireless carrier switch, etc.). Assuming for the sake of illustration only a central office type call control system, the central office (according to one aspect of the invention) provides the calling telecommunications device with the option of calling the number identified by caller ID data. This embodiment of the invention also avoids trombone connections.

The apparatus of the invention includes memory for storing Caller ID information and an interface for transmitting the Caller ID information when messages are retrieved from an answering device. In the case of the first two embodiments, the apparatus utilizes memory of the phone being used to retrieve messages and/or Caller ID data. In the case of the third embodiment, the apparatus includes central office equipment for receiving Caller ID data and dialing phone numbers based on the data.

DETAILED DESCRIPTION

Figure 1:
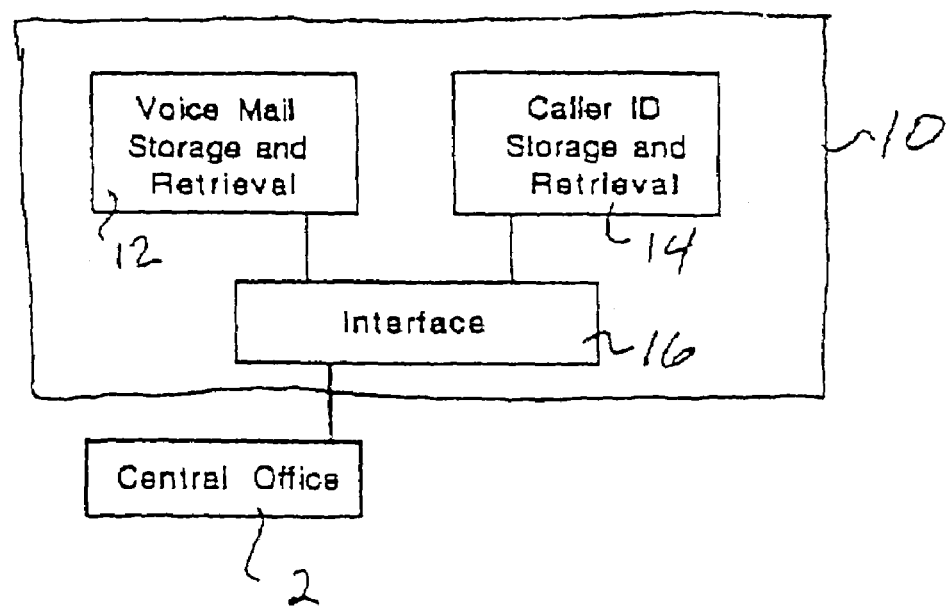
FIG. 1 is a high level block diagram of a first embodiment of the invention.
Figure 1:
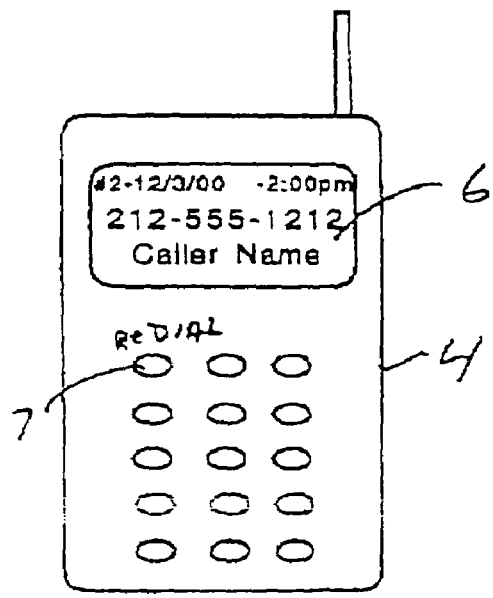

Turning now to FIG. 1, an apparatus 10 (according to one illustrative embodiment of the invention) includes a voice message storage and retrieval unit 12, a Caller ID storage and retrieval unit 14, and an interface 16 for accessing the storage and retrieval units. The instant illustrative embodiment of the invention is intended to be coupled to a telephone company central office 2 and accessed with a telephone 4 having either an associated Caller ID device 6 having a call back function, a redial buffer accessed by a redial button 7, or some other memory for storing Caller ID data retrieved from (or forwarded by) apparatus 10.

The apparatus 10 may be located within a central office 2 as part of a voice mail system maintained by the telephone company or it may be located remotely from a central office, such as at customer maintained premises.

The telephone 4 illustrated in FIG. 1 is a wireless phone with a built-in Caller ID device 6 having a call back function and a redial buffer accessed by a redial button 7. Again however, the apparatus 10 can be used with any telecommunications device (not necessarily a telephone per se, for example a computer, etc.), having either an associated Caller ID device with a call back function, an accessible redial buffer, or other associated memory for storing Caller ID data.

The operation of the embodiment shown in FIG. 1 is described in more detail below with reference to FIG. 3.

Figure 2:
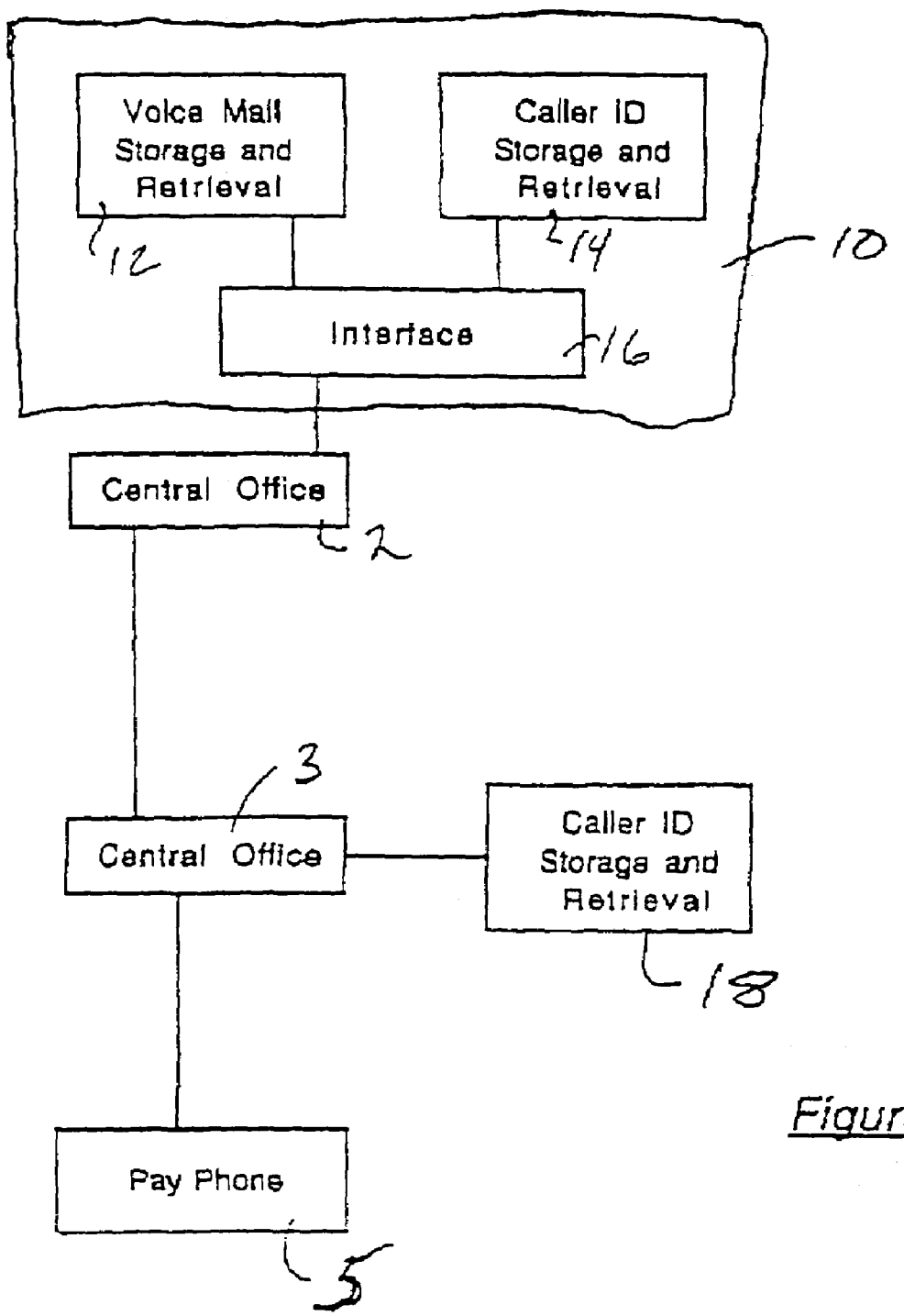
FIG. 2 is a high level block diagram of a second embodiment of the invention.

Turning now to FIG. 2, a second embodiment of the invention includes the same type of apparatus 10 as the first embodiment but is intended to be accessed with a telephone 5, such as a pay phone, having no Caller ID device or other "intelligence" for retrieving, storing and/or utilizing Caller ID data that could be forwarded by apparatus 10.

According to this embodiment, a Caller ID storage and retrieval unit 18, some form of redial buffer memory, etc., is provided at the central office 3 serving the telephone 5. It is expected that the telephone company which sells the apparatus 10 or which sells the services of the apparatus 10 will provide Caller ID storage and retrieval units 18 (or some other form of Caller ID data memory and processing capability) at each central office which is coupled to one or more pay telephones from which message and Caller ID retrieval is being supported. For example, it is expected that pay telephones in airports and train stations are likely points from which voice messages may be retrieved and from which connection to callback numbers may wish to be made.

The operation of the embodiment of FIG. 2 is described in more detail below with reference to FIG. 4.

Figure 3:
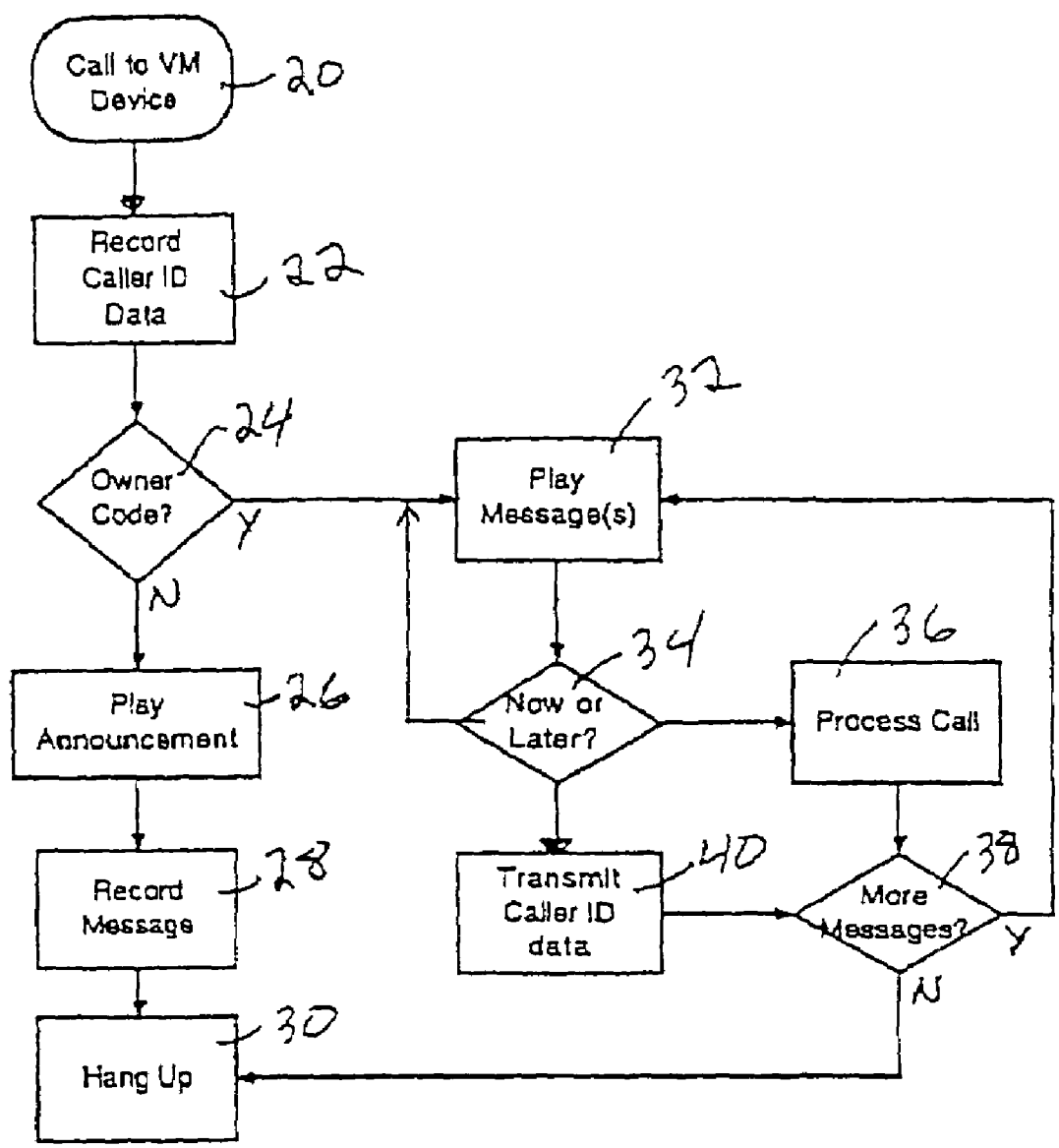
FIG. 3 is a high level flow chart illustrating one of the methods of the invention.

Turning now to FIG. 3, and with reference to FIG. 1, the apparatus 10 of the first embodiment of the invention operates in a manner similar to known answering machines and voice mail systems but for the collection and transmission of Caller ID data.

When a call to the device 10 is received at 20, the device records the Caller ID data at 22 before answering the call. When the call is answered, if no owner code is entered at 24, a prerecorded announcement is played at 26, a message is recorded at 28, and the call is terminated at 30.

If the "owner" of the device enters the proper code at 24, several options may be presented to the "owner" regarding retrieval of message, returning calls, and retrieval of Caller ID data. FIG. 3 illustrates one possible arrangement.

As shown in the illustrative example of FIG. 3, after entering the "owner" code, the owner can retrieve messages at 32. After a message is reviewed, the owner can be given the option at 34 to return the call now or later. Also, the user can be given the option not to return the call at all in which case the exemplary process shown in FIG. 3 continues with message retrieval at 32. The choice of option can be made by keypress or voice response.

If the owner opts to return the call now, the system processes the call at 36 using the Caller ID data associated with the message just reviewed. As previously indicated, according to the invention, "processing" a call (as referred to in FIGS. 3 and 4), means stored Caller ID data may be forwarded to an endpoint telecommunications device or call control servicing device (like a central office), for call completion; rather than making a trombone connection via the answering device. However, it should be noted that the invention does contemplate the possibility of allowing a trombone connection to be made via the answering device. For example, all of the preferred options contemplated by the invention may not available to the user (e.g., no memory for storing numbers, etc.); a user at a pay phone using the invention may not have enough change to place another call, etc.

At the end of the call, the system may (optionally) return the owner to the message retrieval menu at 32 if it is determined at 38 that more messages need to be retrieved, otherwise, it may simply hang up at 30.

If the owner chooses at 34 to return the call later, the Caller ID data is transmitted at 40 to the owner. Depending on the type of equipment the owner is using, he may only be able to store one callback number. If the owner's equipment includes a memory large enough to store many numbers, he may continue to review messages and store numbers for later callback.

FIG. 3 is simplified and it will be appreciated that the step of playing messages at 32 will typically be embedded within menu choices such as fast forward, skip to next message, replay message, delete message, save message, etc. It should also be appreciated that the step 40 of transmitting Caller ID data may be transmitted as a batch of numbers or one at a time as suggested by FIG. 3. In either case, the Caller ID data is transmitted to the owner telephone equipment so that it can be utilized to quickly call back the person who left a voice message.

From the foregoing, those skilled in the art will appreciate that the described illustrative embodiments of the invention may be easily installed either at customer premises or in a central office; and may easily be added to existing voice mail systems.

The transmission of Caller ID data from the answering device to the telephone retrieving messages will differ slightly from the manner in which Caller ID data is presently transmitted from a Caller to a called telephone. Caller ID data is now transmitted with a ring signal. In the present invention, no ring signal will be sent to the phone retrieving messages. Nevertheless, the signaling to the telephone preferably utilizes standard protocol so that it is compatible with existing Caller ID equipment. For example, it is presently known to transmit Caller ID data with a Call Waiting signal.

It will be appreciated, however, that a non-standard signaling could be used and would require that the owner's equipment to be modified to use the signaling adopted by the invention. Possible protocols for transmitting Caller ID data include: any digital signal, any ISDN signal, H.450 signal, a third party call control signal such as TSAPI or CSTA, audio tones in the voice band, an SS7 signal or GSM signals on a wireless network.

Figure 4:
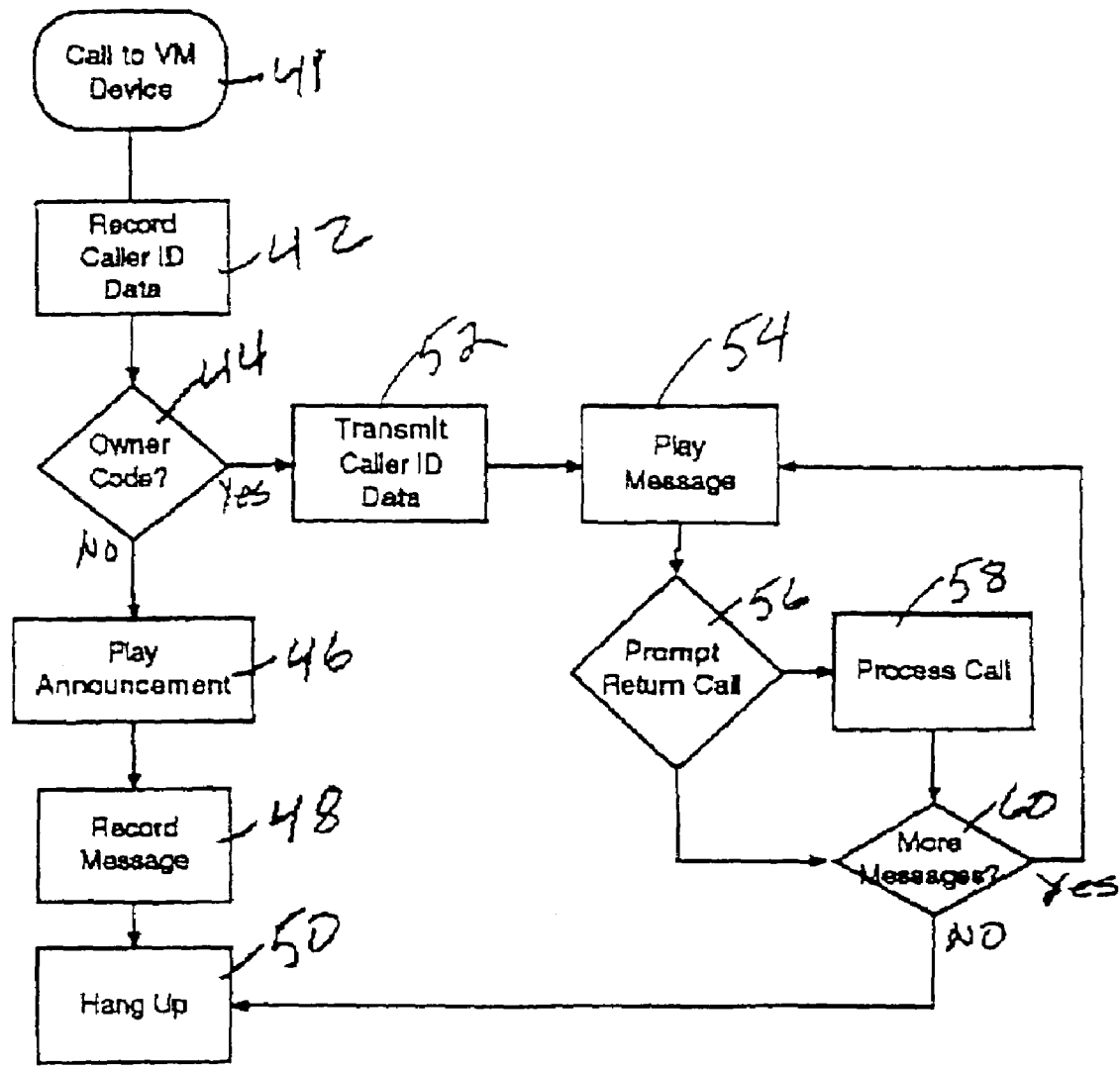
FIG. 4 is a high level flow chart illustrating another of the methods of the invention.

Turning now to FIG. 4, and with reference to FIG. 2, the system 10 receives a call at 41 and records the Caller ID data at 42 before answering the call.

When the call is answered, if it is determined at 44 that messages are not being retrieved, the recorded announcement is played at 46 and the caller's message is recorded at 48 before the call is terminated at 50. If it is determined at 44 that the code for retrieving messages has been entered, the system 10 transmits Caller ID data at 52 to the central office unit 18. A first message is played at 54 and then the central office unit 18 offers the caller the opportunity at 56 to call the party who left the message.

If the option is chosen at 56, the central office unit 18 processes the call at 58. The processing of the call at 58 is preferably accomplished with a dialer at the central office to which the "owner" is most closely connected, thereby avoiding a trombone connection. However, it is expected by the invention that if such equipment is not available at the central office closest to the owner's call, or the user prefers, a trombone connection may (as indicated hereinbefore) be used as a "fall back".

So long as it may be determined at 60 that there are more messages to be retrieved, messages continue to be played at 54, and the user is given the option at 56 to call the party who left the message.

From the foregoing, those skilled in the art will appreciate that FIG. 4 illustrates only one example of how a call control system (such as central office equipment 18), can interact with the equipment 10 in order to provided Caller ID call back functionality to a caller using a telephone which is not provided with a Caller ID device, redial memory, etc.

It will also be appreciated by those skilled in the art that another method of the invention is to batch load all of the messages and Caller ID data from the equipment 10 to the equipment 18 when messages are to be retrieved thereby freeing the connection between central office 2 and central office 3 while messages are played and calls are returned. In that method, the illustrative central office equipment 18 will look more like the equipment 10.

There have been described and illustrated herein methods and apparatus for transmitting Caller ID data from a called answering device to a dialing device, for example a caller retrieving messages from the answering device or a central office device. While particular embodiments of the invention have been described, it is not intended that the invention be limited thereto, as it is intended that the invention be as broad in scope as the art will allow and that the specification be read likewise.

For example, while the invention has been described in conjunction with the retrieval of messages from a message storage and retrieval device, the invention can be used without such a message storage and retrieval device. For example, the invention contemplates a Caller ID storage and retrieval device which records Caller ID data from callers calling the device and which transmits the Caller ID data to a dialing device on the demand of the owner.

It will therefore be appreciated by those skilled in the art that yet other modifications could be made to the provided invention without deviating from its spirit and scope as so claimed.

What is claimed is:

1. A telecommunications system, comprising:
   a voice message storage and retrieval unit;
   a Caller ID data recording unit configured to record Caller ID data from callers calling said system, the Caller ID data including a calling party number, the Caller ID data recording unit being associated with a first call control system;
   an interface configured to transmit the recorded Caller ID data to a remote location when recorded messages are retrieved; and
   a second call control system local to a remote caller calling the system and configured to receive the transmitted Caller ID data;
   wherein said second call control system includes a Caller ID storage and retrieval unit configured to cause the transmitted calling party number included in the received Caller ID data to be called by said second call control system, said second call control system being a call control system more closely connected to the remote caller than the first call control system.

2. A system in accordance with claim 1 wherein said second call control system is a PBX.

3. A system in accordance with claim 1 wherein said second call control system is a telephony-over-LAN (ToL) gatekeeper.

4. A system in accordance with claim 1 wherein said second call control system is a wireless carrier system.

5. A system in accordance with claim 1 wherein said second call control system is a central office.

6. A telecommunications method, comprising:

recording messages from callers calling an answering device;

recording Caller ID data from the callers calling said answering device, the Caller ID data including a calling party number, the answering device being associated with a local call control system;

transmitting the recorded Caller ID data to a remote location when the recorded messages are retrieved by a remote caller; and wherein said transmitting comprises transmitting the recorded Caller ID data to an apparatus in a remote call control system wherein said remote call control system includes a Caller ID storage and retrieval unit configured to cause the transmitted calling party number included in the received Caller ID data to be called by said remote call control system, said remote call control system being a call control system more closely connected to the remote caller than the first call control system.

7. A method according to claim 6 wherein said remote call control system is a PBX.

8. A method according to claim 6 wherein said remote call control system is a telephony-over-LAN (ToL) Gatekeeper.

9. A method according to claim 6 wherein said remote call control system is a wireless carrier system.

10. A method according to claim 6 wherein said remote call control system is a central office.

11. A telecommunications system, comprising:

a voice message storage and retrieval unit;

a Caller ID data recording unit configured to record Caller ID data from callers calling said system, the Caller ID data including a calling party number, the Caller ID data recording unit being associated with a first call control system;

an interface configured to transmit the recorded Caller ID data to a remote location when the recorded messages are retrieved; and a second call control system local to a remote caller calling the system and configured to receive the transmitted Caller ID data from the Caller ID data recording unit associated with the first call control system;

wherein said second call control system includes a Caller ID storage and retrieval unit configured to cause the transmitted calling party number included in the received Caller ID data to be called by said second call control system, said second call control system being a call control system more closely connected to the remote caller than the first call control system;

wherein said remote caller includes a telephone having no caller ID device intelligence.

* * * * *